United States Patent [19]

Kosterka

[11] Patent Number: 4,709,812
[45] Date of Patent: Dec. 1, 1987

[54] COMPACT DISC PACKAGE AND A METHOD OF MAKING SAME

[75] Inventor: Donald W. Kosterka, Chicago, Ill.

[73] Assignee: AGI Incorporated, New York, N.Y.

[21] Appl. No.: 884,730

[22] Filed: Jul. 11, 1986

[51] Int. Cl.⁴ .............................................. B65D 85/67
[52] U.S. Cl. .................................... 206/310; 206/311; 493/946
[58] Field of Search ............... 206/309, 310, 311, 312; 493/946; 229/68 R

[56] References Cited

U.S. PATENT DOCUMENTS

| | | | |
|---|---|---|---|
| 1,502,312 | 7/1924 | Mayhew | 206/311 X |
| 3,556,391 | 1/1971 | Kosterka | 229/68 R |
| 4,176,744 | 12/1979 | Borzak | 206/310 X |
| 4,327,831 | 5/1982 | Inaba et al. | 206/310 |
| 4,535,888 | 8/1985 | Nusselder | 206/444 |
| 4,635,792 | 1/1987 | Yamada et al. | 206/310 |

FOREIGN PATENT DOCUMENTS

| | | |
|---|---|---|
| 1198208 | 12/1985 | Canada . |
| 0159860 | 10/1985 | European Pat. Off. . |
| 3425579 | 1/1986 | Fed. Rep. of Germany . |
| 1050913 | 9/1953 | France .......... 206/312 |
| 2135274 | 8/1984 | United Kingdom . |
| 2147262 | 5/1985 | United Kingdom . |

Primary Examiner—William Price
Attorney, Agent, or Firm—Davis Hoxie Faithfull & Hapgood

[57] ABSTRACT

The invention comprises a package for a compact disc formed from a prescored, preprinted unitary blank or sheet and at least one injection molded plastic compact disc holder. The invention also includes a method of making the package comprising the steps of securing at least one compact disc holder to a sheet or unitary blank, placing and securing a compact disc into each compact disc holder, folding the resultant assembly along fold lines, erecting a carton for the folded assembly, inserting the assembly into the erected carton and shrink-wrapping the resultant carton assembly.

22 Claims, 9 Drawing Figures

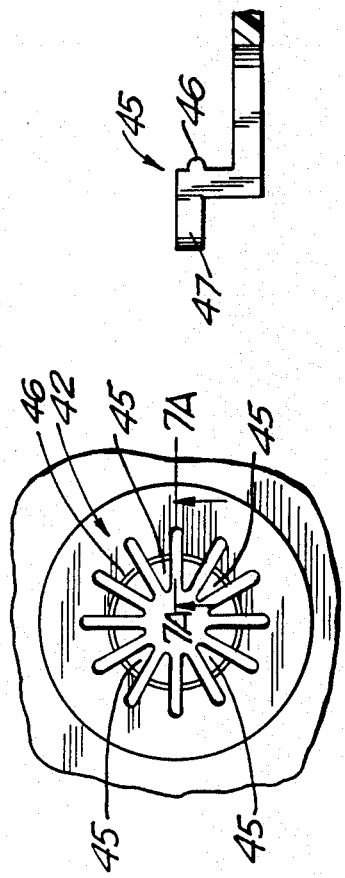
FIG. 7A
FIG. 7
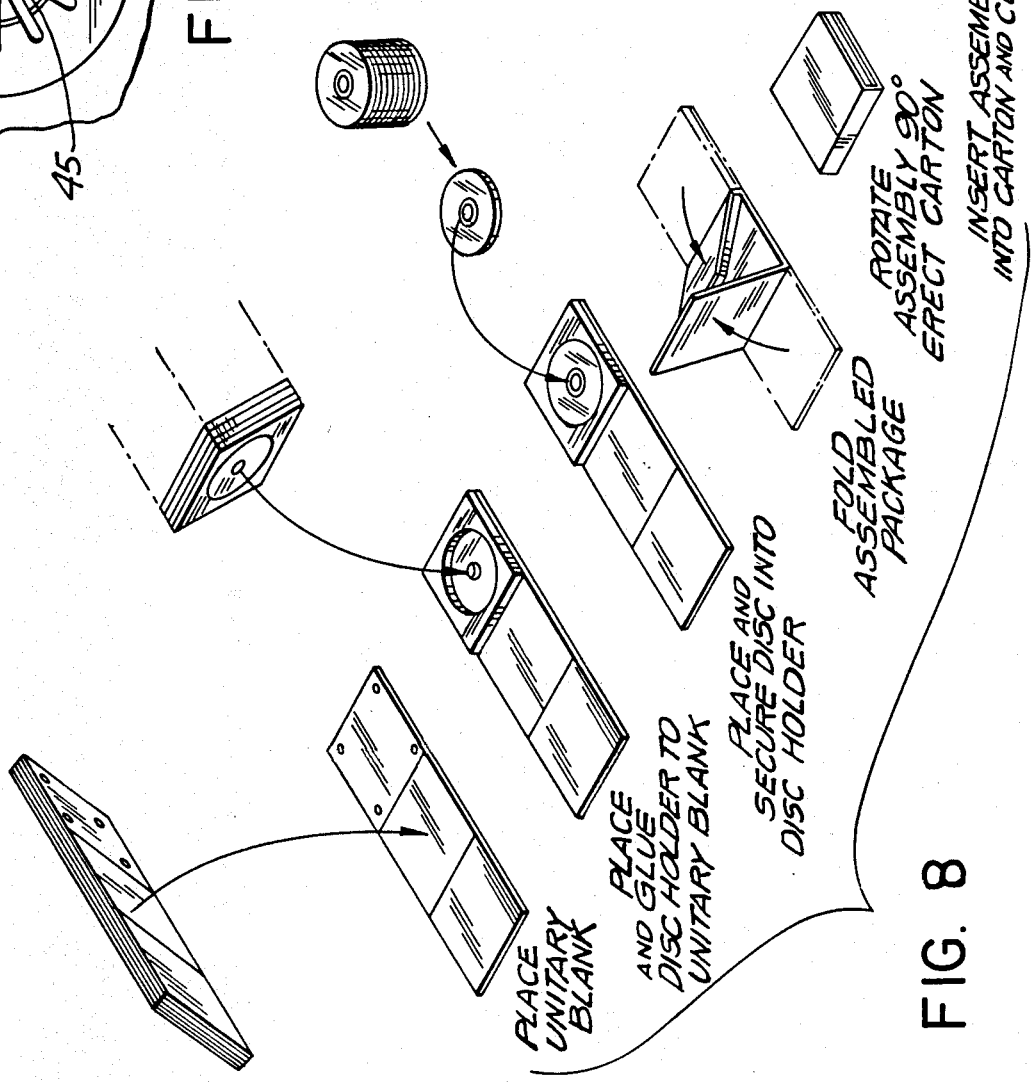
FIG. 8

COMPACT DISC PACKAGE AND A METHOD OF MAKING SAME

The "compact disc" or "CD," a 4.7 inch diameter metal record containing laser-readable information, is rapidly becoming a significant consumer product in the field of recorded music. With the advent of the compact disc and compact disc players, there is a concomitant need for an attractive, durable package in which to display, sell and store the compact disc.

Until the advent of the present invention, the package of choice was the so-called "jewel box," generally comprising three separate pieces of plastic, including clear front and back package panels and an opaque compact disc holder which snap-fits into the back package panel. The panels of the jewel box are normally hingedly connected along one edge so as to open like a book. However, as thus assembled, the package is devoid of promotional material. Thus, at least one, and more usually two, preprinted inserts are included in the jewel box, one being held between the compact disc holder and the back panel so as to be displayed through the clear plastic of the panel, and the other being inserted between the clear plastic front panel and specially provided tabs projecting from the depending side walls of the front panel, which tabs are generally parallel to the front panel and provide support to hold the preprinted insert against the inside of the panel. Upon opening the jewel box, the customer can readily slide the front panel insert out, if desired, and examine it. Often, the front panel insert comprises a multi-page pamphlet or booklet which provides more information than could comfortably be included on just two sides of a single sheet insert.

The jewel box, though attractive in quality, appearance and feel, is cumbersome, difficult and expensive to construct, since it comprises at least three separate plastic pieces which must be manually fit together, and, normally, one or two preprinted inserts, in addition to the compact disc itself.

The present invention provides a package for display, sale and storage of a compact disc which is both simple and inexpensive to manufacture yet shares the attractive aspects of the jewel box.

The invention also provides a package which can be preprinted on several surfaces prior to erection of the package.

The invention also provides a package which comprises a unitary blank and at least one compact disc holder for a CD. The unitary blank can be preprinted and can be prescored along fold lines so that the final package has, for example, 4, 5, 7 or 9 panels for graphics and can hold one or two CDs, as desired.

Furthermore, according to a method of the invention, the package can be assembled, the CD or CDs inserted and the package folded to a closed condition. A cover carton for the package can be separately erected, stuffed with a filled package and then wrapped with a clear plastic film, such as "shrink-wrap."

The invention will be further appreciated from the following detailed description, in which:

FIG. 7 is a detail view of retaining element 42 of the CD holder;

FIG. 7A is a cross-section of one of the pliable plastic tabs which comprise element 42; and FIG. 8 illustrates a method of making a package of the invention.

Figure 1:
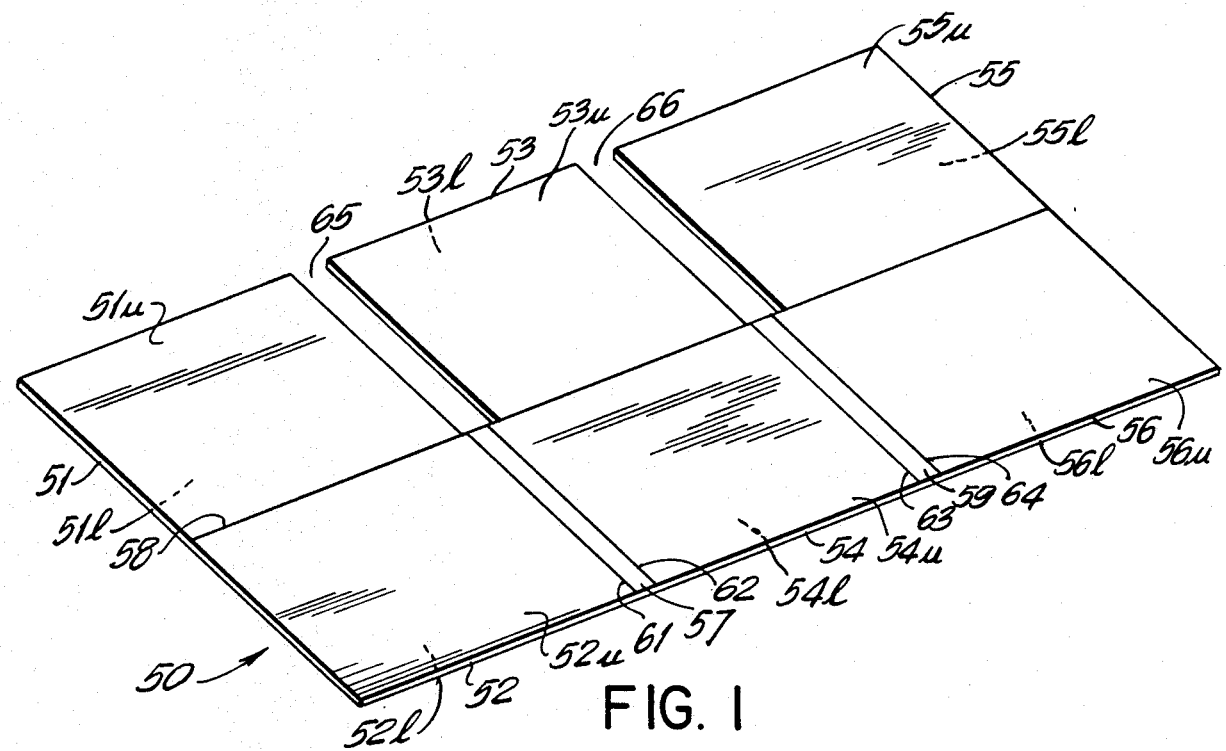
FIG. 1 shows an unfolded blank from which one embodiment of the CD package of the present invention may be constructed.

Referring first to FIG. 1, blank 50 in its unassembled state comprises a rectangular paperboard sheet divided into six sections, 51, 52, 53, 54, 55 and 56. The sections 52, 54 and 56 are separated from each other by relatively thin strips 57 and 59, and these strips are bounded respectively by fold lines 61 and 62 (in the case of strip 57) and 63 and 64 (in the case of strip 59). Sections 51, 53 and 55 are separated from each other by slots 65 and 66 for reasons to be explained below. In the embodiment shown in FIG. 2, in which a single CD is packaged in the simplest version of the present invention, printing or artwork can be applied to the lower faces of sections 51 and 53, designated in FIG. 1 as 51*l* and 53*l*, and to the lower faces of sections 52, 54 and 56, designated as 52*l*, 54*l*, and 56*l*.

Figure 2:
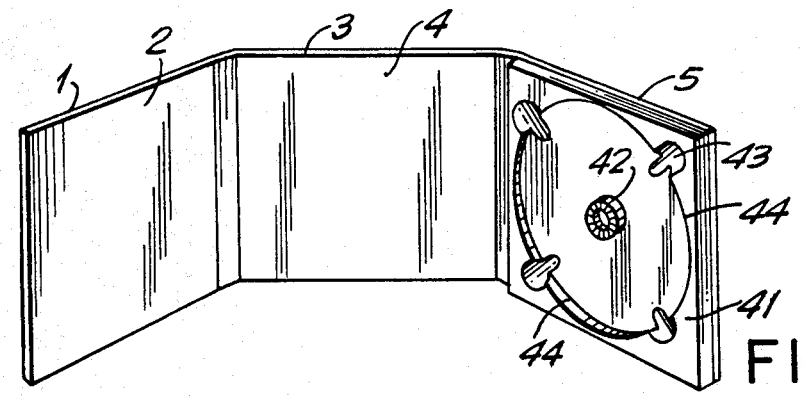
FIG. 2 illustrates the embodiment of the invention shown in FIG. 1, which includes a CD holder and five panels (elements 1 through 5) for graphics, after its assembly.

During assembly of the package into the form shown in FIG. 2, sections 51, 53 and 55 are folded over along fold line 58 provided in blank 50 respectively on top of sections 52, 54 and 56 and then glued down to the latter sections. The width of slots 65 and 66 are chosen to be slightly wider than the width of strips 57 and 59 so that, for example when section 51 is folded over on top of section 52 as shown in FIG. 2, it does not extend across the fold line 61. After the folding operation is completed, a CD holder 41 is glued or otherwise affixed to the lower face 55*l* of the right-hand segment comprising section 55 which is now glued to section 56.

Further during assembly, preferably after the sections 51, 53 and 55 are folded and glued, the resulting segments are folded with respect to each other along fold lines 61, 62, 63 and 64, to arrive at the construction shown in FIG. 2.

For a clean appearance and greatest structural integrity, the width of strip 59, that is, the distance between fold lines 63 and 64, should be just slightly greater than the depth of holder 41 plus the thickness of sections 55 and 56 as glued together. For similar reasons, the width of strip 57, that is, the distance between fold lines 61 and 62, should be just slightly greater than the width of strip 59 plus the thickness of sections 53 and 54 as glued together. When these dimensions are adhered to, the resulting CD package forms a tight, protective enclosure for the CD within.

CD holder 41 preferably comprises an injection molded plastic element, similar in size and construction to the CD holder, found in the prior art jewel box. One skilled in the art of injection molding would readily appreciate how to construct the CD holders, once knowing the dimensions of the CD (approximately 4.7 inches in outer diameter) and the desired dimensions of the holder (approximately 4.9 inches long by 5.5 inches wide by 0.15 inches thick). The central hole in the CD is approximately 0.6 inches in diameter and the CD holder is constructed so that the thickness of the holder 41 outside the circumference 44 is approximately 0.15 inches. The portion of the CD holder within the circumference 44 is preferably of reduced thickness so as to provide a recess into which the CD fits. As will be appreciated, the circumference of the CD itself will be approximately, but slightly smaller than, circumference 44. Thus, when the CD is in place in the package, the surface of the CD preferably does not protrude above the surface of holder 41. Element 42 of the CD holder provides means for retaining the CD on the holder 41. (See FIGS. 7 and 7A.) Thus, any of the conventional means for providing frictional engagement between element 42 and the circumference of the central hole of the CD can be used. Preferably, upstanding pliable plastic tabs 45 comprise element 42, such as those used in the conventional jewel box. The tabs 45 frictionally engage the circumference of the central hole of the CD and hold it in place.

If desired, the tabs can include detent means 46 to removably "lock" the CD into the recess provided in the CD holder, as for storage. Detent means 46 comprise a bead molded onto a vertical section of tab 45. The CD holder 41 is preferably also provided with one or more finger slots 43, so that the user can slide a fingertip under the edge of the CD while simultaneously exerting a slight downward force with his/her thumb on the horizontally disposed edge flaps 47 of the upstanding pliable plastic tabs 45. The force of the user's thumb will slightly deform the upstanding tabs radially toward the center of the CD holder, thus permitting the detent means 46 to pass through the central hole in the CD, allowing the user to disengage the CD from element 42 for removal.

Figure 3:
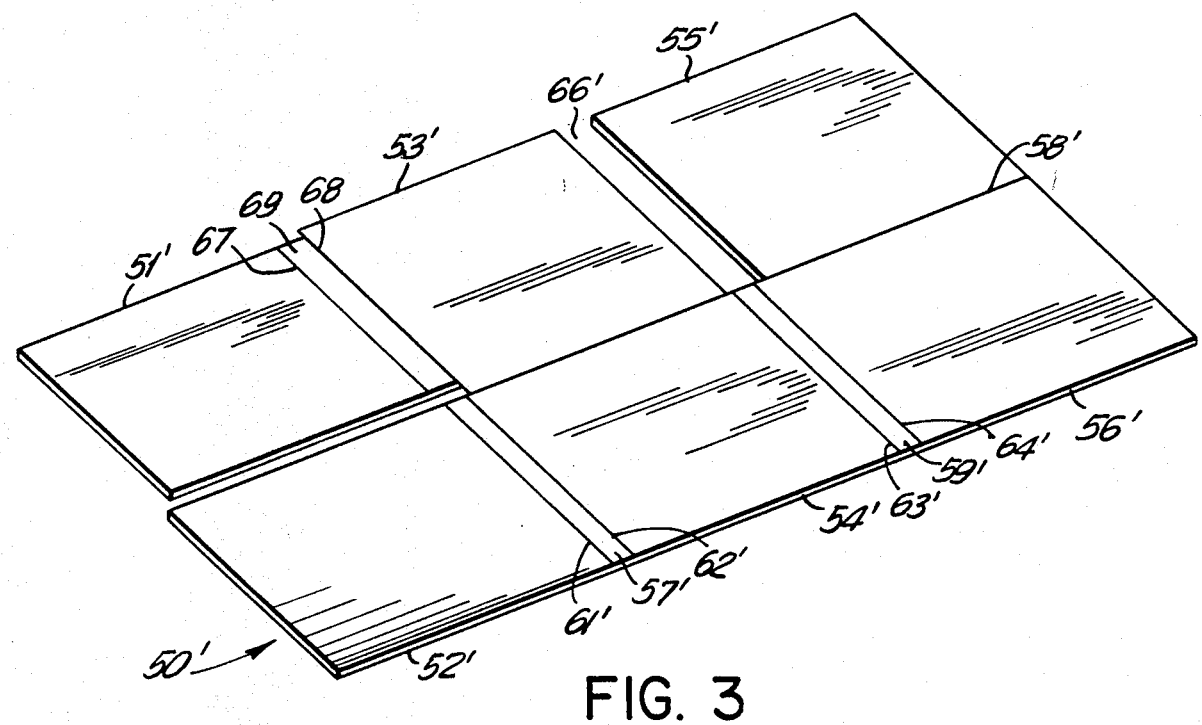
FIG. 3 shows an unfolded blank from which a second embodiment of the CD package of the present invention may be constructed.

FIG. 3 illustrates another embodiment of the present invention, a CD package having seven panels which are available for graphics. In this FIG. 3, elements analogous to elements shown in FIG. 1 are similarly numbered except for a "prime" symbol. In FIG. 3, blank 50' in its unassembled state comprises a rectangular paperboard sheet divided into six sections, 51', 52', 53', 54', 55' and 56'. The sections 52', 54' and 56' are separated from each other as before by relatively thin strips 57' and 59', and these strips are bounded respectively by fold lines as before. Sections 53' and 55' are separated from each other by slot 66' for reasons explained above with respect to the first emobdiment; however, sections 51' and 53' are not separated as in that embodiment of the invention. Rather, sections 51' and 53' are joined by strip 69 which is bounded by fold lines 67 and 68. The width of strip 69 is chosen to be the same as or very slightly smaller than the width of strip 57'.

Figure 4:
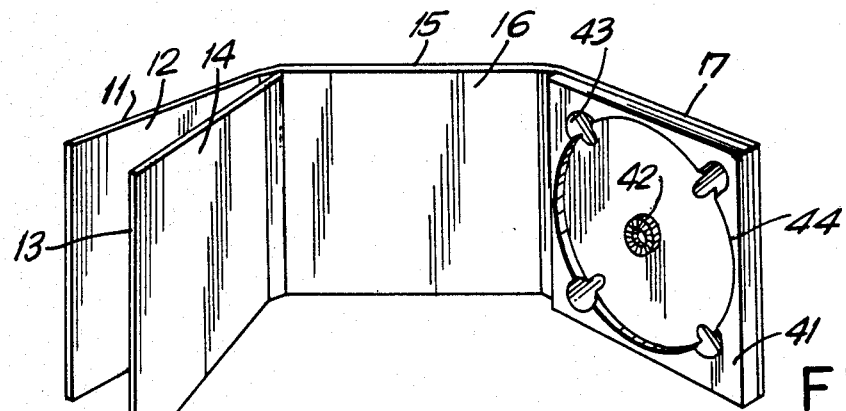
FIG. 4 illustrates the embodiment of the invention shown in FIG. 3, which includes a CD holder and seven panels (elements 11 through 17) for graphics, after its assembly.

During assembly of this package into the form shown in FIG. 4, sections 51', 53' and 55' are folded over along fold line 58' and sections 53' and 55' are then glued down to the sections 54' and 56'. However, in this embodiment, section 51' is not attached to section 52'; instead, no glue is applied to the left of fold line 68 on FIG. 3 and section 51' is left as a leaf attached only at one side, to section 53', and otherwise free to be rotated along fold line 67 and strip 69 so that graphics material on either its upper face or its lower face can be read.

As with the embodiment shown in FIG. 1, the width of slot 66' is chosen to be slightly wider than the width of strip 59' so that when section 55' is folded over on top of section 56' as shown in FIG. 4, it does not extend across the fold line 64'. Remaining assembly steps are performed as in the earlier described embodiment.

Figure 5:
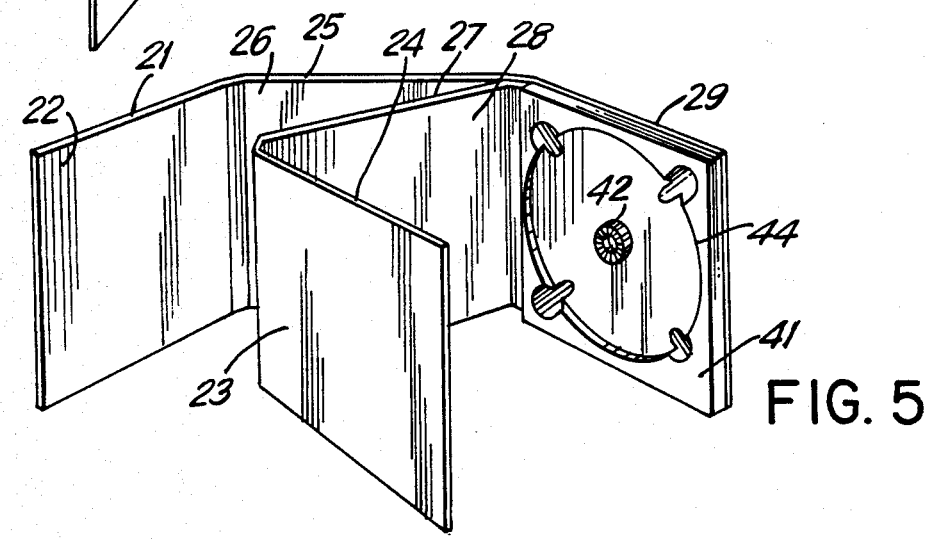
FIG. 5 illustrates a third embodiment of the invention which includes a CD holder and nine panels for graphics.

FIG. 5 illustrates a CD package having nine panels, elements 21 through 29, which are available for graphics.

Figure 6:
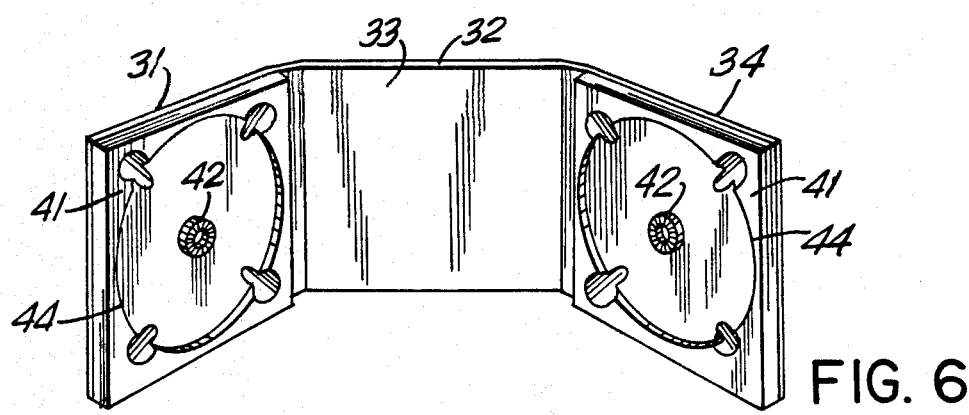
FIG. 6 illustrates a fourth embodiment of the invention which includes two CD holders and four panels for graphics.

FIG. 6 illustrates a CD package for storage of two CDs and having four panels, elements 31 through 34, which are available for graphics.

The blank of the present invention is preferably comprised of paperboard, preprinted as described above, which provides strength for the package and protection for the CD therein. Suitable alternatives include foil-laminated paperboard, acetate (film) laminated paperboard and vinyl laminated paperboard. In lieu of preprinting, other means of expressing concepts, such as embossing, stamping, leaf stamping, or the like can be used.

The CD holder of the invention is preferably made of any conventional injection molded plastic material. Preferred is medium impact styrene.

FIG. 8 illustrates a preferred method of making a CD package of the invention. A CD holder is glued to at least one section of a prescored, preprinted unitary blank, the CD is placed and secured into the CD holder and the assembly is then folded along the score lines. A carton is erected, the folded assembly is then inserted into the erected carton, the carton is closed and then enclosed in shrink-wrap. The carton can be constructed of the same material and preprinted in the same manner as the unitary blank.

The invention comprises a package for a compact disc comprising a rectangular sheet divided into two rows of three rectangular sections, the rows being separated by a fold line, the three sections in the first row being separated from each other by strips having a width small relative to the width of the sections, the strips being bounded by fold lines, the three sections in the second row being separated from each other by a total number of (2−x) slots and x strips, wherein x is 0, 1 or 2, the slots, if any, having a width slightly greater than the width of the strips in the first row, the strips, if any, having a width approximately equal to the width of the strips in the first row, the second row being folded along the fold line so that each of the sections of the second row partially overlies a section of the first row but does not overlie any strip adjacent that section of the first row, the overlying sections which share common fold lines being joined together to form one or more segments; at least one compact disc holder adhered to the segment at a first end of the sheet; the width of the sections in the first row, of the strips and of the slots, if any, being predetermined so that when the segment to which the holder has been adhered is folded along the fold lines bordering the strip at its edge and the sections or segment at the second end of the sheet is folded along the fold lines bordering the strip at its edge, the sections and segments abut each other.

What is claimed is:
1. A package for a compact disc comprising:
a rectangular sheet divided into two rows of three rectangular sections, the rows being separated by a fold line, the three sections in the first row being separated from each other by strips having a width small relative to the width of the sections, the strips being bounded by fold lines, the three sections in the second row being separated from each other by slots having a width slightly greater than the width of the strips, the second row being folded along the fold line so that each of the sections of the second row partially overlies a section of the first row but does not overlie any strip adjacent that section of the first row, the overlying sections being joined together to form segments;

at least one compact disc holder adhered to the segment at a first end of the sheet;

the width of the sections in the first row, of the strips and of the slots being predetermined so that when the segment to which the holder has been adhered is folded along the fold lines bordering the strip at its edge and the segment at the second end of the sheet is folded along the fold lines bordering the strip at its edge, the three segments abut each other.

2. The package of claim 1 wherein the compact disc holder comprises injection molded plastic.

3. The package of claim 1 wherein the compact disc holder includes at least one finger slot.

4. The package of claim 1 wherein the sheet is preprinted on one or more surfaces.

5. The package of claim 1 wherein the sheet comprises paperboard.

6. A method of manufacturing a package for a compact disc from a rectangular sheet divided into two rows of three rectangular sections, the rows being separated by a medial fold line, the three sections in the first row being separated from each other by strips having a width small relative to the width of the sections, the strips being bounded by fold lines, the three sections in the second row being separated from each other by slots having a width slightly greater than the width of the strips, the width of the sections in the first row, of the strips and of the slots being predetermined so that when the package has been completed segments formed by overlying sections abut one another, and a compact disc holder, comprising the steps of:

folding the sheet along the medial fold line so that each section in the second row overlies a section in the first row;

attaching the overlying sections to their respective underlying sections to form three segments, namely, two end segments and an intermediate segment;

affixing the compact disc holder to a first end segment;

folding the segment containing the compact disc holder along the fold lines bounding the strip separating the segment from the intermediate segment over the intermediate segment; and folding the second end segment along the fold lines bounding the strip separating the second end segment from the intermediate segment over the other two segments.

7. The method of claim 6 which further comprises the steps of placing and securing a compact disc into each compact disc holder and folding the resultant assembly along the fold lines.

8. The method of claim 6 wherein the sheet is preprinted on one or more surfaces.

9. The method of claim 6 wherein the compact disc holder comprises injection molded plastic.

10. The method of claim 6 wherein the compact disc holder includes at least one finger slot.

11. The method of claim 6 wherein the sheet comprises paperboard.

12. The method of claim 7 wherein the sheet is preprinted on one or more surfaces.

13. The method of claim 7 wherein the compact disc holder comprises injection molded plastic.

14. The method of claim 7 wherein the compact disc holder includes at least one finger slot.

15. The method of claim 7 wherein the sheet comprises paperboard.

16. The method of claim 7 which further comprises the steps of erecting a carton for the folded assembly, inserting the assembly into the erected carton and shrink-wrapping the resultant carton assembly.

17. The method of claim 16 wherein the sheet and the carton are preprinted on one or more surfaces.

18. The method of claim 16 wherein the compact disc holder comprises injection molded plastic.

19. The method of claim 16 wherein the compact disc holder includes at least one finger slot.

20. The method of claim 16 wherein the sheet comprises paperboard.

21. A package for a compact disc comprising:

a rectangular sheet divided into two rows of three rectangular sections, the rows being separated by a fold line, the three sections in the first row being separated from each other by strips having a width small relative to the width of the sections, the strips being bounded by fold lines, the three sections in the second row being separated from each other by a total number of $(2-x)$ slots and x strips, wherein x is 0, 1 or 2, the slots, if any, having a width slightly greater than the width of the strips in the first row, the strips, if any, having a width approximately equal to the width of the strips in the first row, the second row being folded along the fold line so that each of the sections of the second row partially overlies a section of the first row but does not overlie any strip adjacent that section of the first row, the overlying sections which share common fold lines being joined together to form one or more segments;

at least one compact disc holder adhered to the segment at a first end of the sheet;

the width of the sections in the first row, of the strips and of the slots, if any, being predetermined so that when the segment to which the holder has been adhered is folded along the fold lines bordering the strip at its edge and the sections or segment at the second end of the sheet is folded along the fold lines bordering the strip at its edge, the sections and segments abut each other.

22. A package for a compact disc comprising:

a rectangular sheet divided into two rows of two rectangular sections, the rows being separated by a fold line, the two sections in the first row being separated from each other by a strip having a width small relative to the width of the sections, the strip being bounded by fold lines, the two sections in the second row being separated from each other by a slot having a width slightly greater than the width of the strip, the second row being folded along the fold line so that each of the sections of the second row partially overlies a section of the first row but does not overlie the strip adjacent that section of the first row, the overlying sections being joined together to form segments;

at least one compact disc holder adhered to a segment;

the width of the sections in the first row, of the strip and of the slot being predetermined so that when the segment to which the holder has been adhered is folded along the fold lines bordering the strip between it and the other segment, the two segments abut each other.

* * * * *